US010046816B2

(12) United States Patent
Johannsen (10) Patent No.: US 10,046,816 B2
(45) Date of Patent: Aug. 14, 2018

(54) CARTRIDGE ASSEMBLY WITH A FLEXIBLE THRUST RING ASSEMBLY FOR A TRACK CHAIN

(71) Applicant: Caterpillar Inc., Peoria, IL (US)

(72) Inventor: Eric James Johannsen, Metamora, IL (US)

(73) Assignee: Caterpillar Inc., Deerfield, IL (US)

( * ) Notice: Subject to any disclaimer, the term of this patent is extended or adjusted under 35 U.S.C. 154(b) by 103 days.

(21) Appl. No.: 15/204,705

(22) Filed: Jul. 7, 2016

(65) Prior Publication Data

US 2018/0009491 A1 Jan. 11, 2018

(51) Int. Cl.
*B62D 55/088* (2006.01)
*B62D 55/21* (2006.01)
*F16C 17/04* (2006.01)

(52) U.S. Cl.
CPC ......... *B62D 55/0887* (2013.01); *B62D 55/21* (2013.01); *F16C 17/04* (2013.01); *B62D 55/213* (2013.01)

(58) Field of Classification Search
CPC .... B62D 55/0897; B62D 55/21; B62D 55/22; F16C 17/04; B60B 27/026; B62K 2025/025
USPC ......... 305/59, 100, 102, 103, 104, 117, 118, 305/202; 301/110.5, 124.1, 124.2
See application file for complete search history.

(56) References Cited

U.S. PATENT DOCUMENTS

| 3,614,113 | A | 10/1971 | Burk |
| 3,773,393 | A * | 11/1973 | Story ..................... B62D 55/15 305/119 |
| 4,179,130 | A | 12/1979 | Fass et al. |
| 5,069,509 | A | 12/1991 | Johnson et al. |
| 5,257,858 | A | 11/1993 | Taft |
| 6,739,680 | B2 | 5/2004 | Hasselbusch et al. |
| 7,347,513 | B2 * | 3/2008 | Johannsen ............. B62D 55/21 305/104 |
| 8,025,346 | B2 | 9/2011 | Livesay |
| 8,070,241 | B2 | 12/2011 | Mulligan |
| 9,623,920 | B2 * | 4/2017 | Akinlua ............. B62D 55/0887 |
| 2004/0036353 | A1 * | 2/2004 | Hasselbusch .......... B62D 55/21 305/202 |
| 2006/0181151 | A1 * | 8/2006 | Wodrich ................ B62D 55/15 305/201 |

(Continued)

FOREIGN PATENT DOCUMENTS

| EP | 0028876 B1 | 2/1983 |
| EP | 2289775 | 3/2011 |

(Continued)

*Primary Examiner* — S. Joseph Morano
*Assistant Examiner* — Jean Charleston
(74) *Attorney, Agent, or Firm* — Law Office of Kurt J. Fugman LLC (57) ABSTRACT

A flexible thrust washer member comprises a body including an annular skirt portion that defines an outer diameter and a central aperture having an inner diameter, wherein the body has a conical configuration that defines a conical axis and a radial direction and the outer diameter of the annular skirt portion is spaced away from the central aperture along the conical axis and along the radial direction, defining an axial dimension and a radial dimension and the body defines at least two slits that separate the annular skirt portion into a plurality of fingers.

19 Claims, 9 Drawing Sheets

(56) References Cited

U.S. PATENT DOCUMENTS

| | | | |
|---|---|---|---|
| 2009/0102281 A1* | 4/2009 | Diekevers | B62D 55/145 |
| | | | 305/104 |
| 2011/0049975 A1* | 3/2011 | Mulligan | B62D 55/092 |
| | | | 305/196 |
| 2013/0002010 A1 | 1/2013 | Hasselbusch et al. | |
| 2015/0197293 A1 | 7/2015 | Diekevers et al. | |

FOREIGN PATENT DOCUMENTS

| | | |
|---|---|---|
| JP | 2002225758 A | 8/2002 |
| JP | 2013147055 A | 8/2013 |
| WO | 8100293 | 2/1981 |
| WO | 9119634 | 12/1991 |

* cited by examiner

CARTRIDGE ASSEMBLY WITH A FLEXIBLE THRUST RING ASSEMBLY FOR A TRACK CHAIN

TECHNICAL FIELD

The present disclosure relates to a track chain for a machine that uses an endless track for mobility. More particularly, the present disclosure is related to a cartridge assembly that comprises a track pin, a bushing, seal assemblies, and a flexible thrust ring, etc.

BACKGROUND

Many machines used in the construction, earth moving, mining or similar industries use an endless articulated track that is powered by a motor for moving in a work environment. Tracks used by such machines often have a track chain with shoes attached to it that provide traction on work surfaces such as soil, sand, etc. The joints of the articulated track may have a cartridge assembly that includes a number of parts including a track pin, a bushing, seal assemblies, one or more bearing members, one or more collars, and a thrust ring that is positioned adjacent a seal assembly and that prevents movement of components near the seal assembly from crushing the assembly along a longitudinal direction of the track pin.

In some cases, the track pin is either rotatably or fixedly attached to a pair of chain links and the bushing is rotatably disposed about the track pin in between the chain links. As can be imagined, the cartridge assembly is subjected to high loads during operation. Sometimes, these loads are at least partially directed along the longitudinal direction of the track pin. It has been found that over time, the thrust ring may become chipped or exhibit other forms of wear, necessitating replacement of the thrust ring requiring machine maintenance and lost revenue. Thrust rings that are made using a powered metal sintering process are particularly prone to develop these problems.

SUMMARY OF THE DISCLOSURE

A flexible thrust washer assembly is provided comprising at least a first flexible thrust washer member that includes a body comprising an annular skirt portion that defines a central aperture having an inner diameter, the annular skirt portion also defining an outer diameter wherein the body has a conical configuration that defines a conical axis and a radial direction and the outer diameter of the annular skirt portion is spaced away from the central aperture along the conical axis and along the radial direction, defining an axial dimension and a radial dimension, and at least a second flexible thrust washer member that is similarly configured as the first flexible thrust washer member. The assembly defines axial extremities of the assembly and an axial dimension therebetween, wherein a ratio between the axial dimension of the assembly to the radial dimension of the annular skirt of a flexible thrust washer member ranges from 6:1 to 1:1.

A flexible thrust washer member is provided that comprises a body. The body includes an annular skirt portion that defines a central aperture having an inner diameter, the annular skirt portion also defining an outer diameter, wherein the body has a conical configuration that defines a conical axis and a radial direction and the outer diameter of the annular skirt portion is spaced away from the central aperture along the conical axis and along the radial direction, defining an axial dimension and a radial dimension, and wherein the body defines at least two slits that separate the annular skirt portion into a plurality of fingers that are configured to resiliently bend when a load is applied to the fingers.

A cartridge assembly for a track chain is provided comprising a first bearing member having a first end portion, a second end portion, a bore defined therethrough and a seal groove defined in said second end portion, a track pin disposed within said first bore of said bearing member, a bushing having a passage defined therethrough, said bushing being positioned relative to said track pin and said first bearing member such that said track pin is disposed within said passage and an end face of said bushing is positioned in an opposing relationship with said seal groove of said first bearing member, a first collar having a first end portion, a second end portion, and a bore defined therein, said first collar having a seal groove positioned in the second end portion of said first collar and being positioned relative to said track pin and said first bearing member such that said track pin is disposed within said bore and said second end portion of said first collar is positioned in an opposing relationship with said first end portion of said first bearing member, a seal assembly disposed in the seal receiving groove of the bearing member or the collar, and a flexible thrust washer assembly disposed into the seal receiving groove between the seal assembly and the track pin.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or a prime indicator such as 100', 100" etc. It is to be understood that the use of letters or primes immediately after a reference number indicates that these features are similarly shaped and have similar function as is often the case when geometry is mirrored about a plane of symmetry. For ease of explanation in this specification, letters or primes will often not be included herein but may be shown in the drawings to indicate duplications of features discussed within this written specification.

This disclosure provides a flexible thrust washer assembly that may be used with any type of pin joint, but is particularly well suited to be used with a cartridge type pin joint used in track chain assemblies and the like. The flexible thrust washer assembly may comprise a plurality of flexible thrust washer members that may be stacked in parallel, in series or any combination thereof and be dimensioned to provide the desirable amount of stiffness between various components of the pin joint. The flexible thrust washer assembly may or may not be used with a rigid thrust washer member for any of the embodiments discussed herein.

Figure 1:
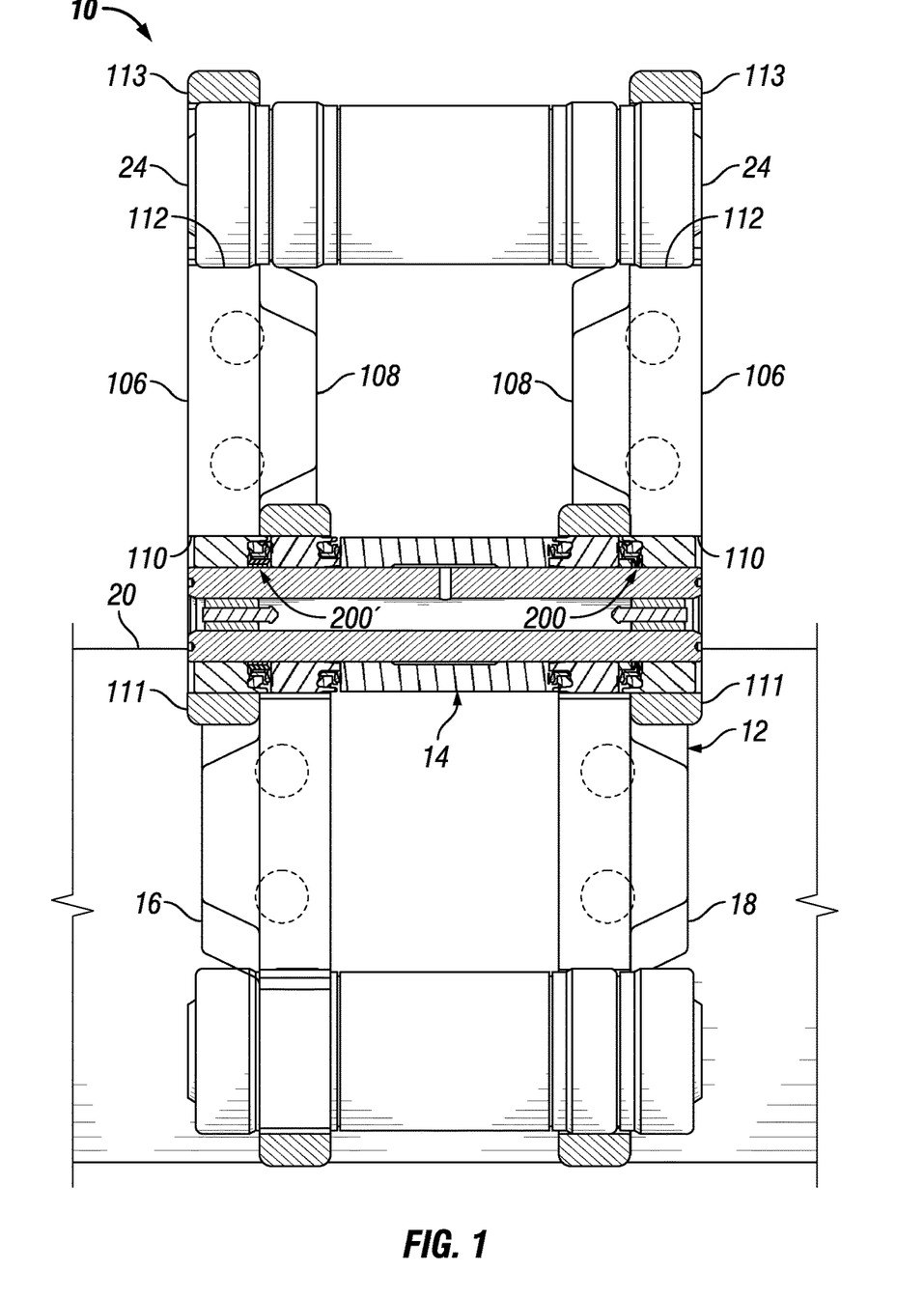
FIG. 1 is a top view of a portion of a track chain assembly according to an embodiment of the present disclosure.

Referring now to FIG. 1, a track chain assembly 10, only a portion of which is shown, includes a plurality of subassemblies 12. Each subassembly 12 includes a cartridge assembly 14, an inner and outer link 16, 18 and a track shoe 20 connected to the outer and inner links 16, 18. A number of subassemblies 12 are mechanically coupled to adjacent subassemblies 12 so that when an appropriate number of these subassemblies 12 are connected together, the track chain assembly 10 is formed. The track chain assembly 10 has a predetermined length for a given application with opposite ends that are capable of being connected together to form a closed loop. The closed loop is formed by mechanically coupling the opposite ends together with an inner and outer master link 22, 24. The cartridge assembly 14 may comprise one or more embodiments of a flexible thrust washer assembly 200, 200'.

Figure 3:
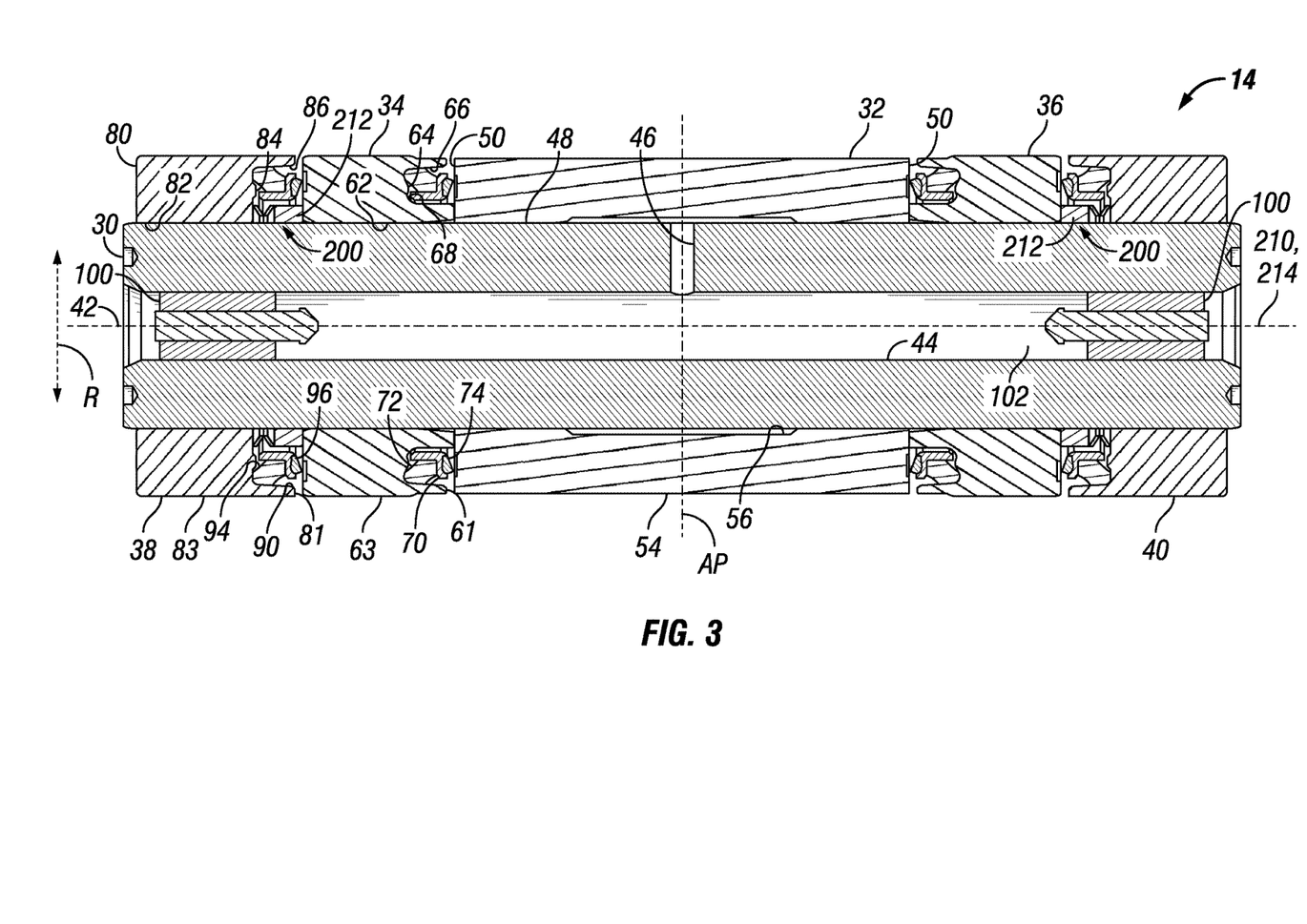
FIG. 3 is cross-sectional view of a cartridge assembly of FIG. 1 or 2 taken along a radial plane that passes through the longitudinal axis of the track pin of the cartridge assembly.

As shown in FIG. 3, cartridge assembly 14 includes a track pin 30, a bushing 32, first and second bearing members 34, 36, and first and second collars 38, 40. The track pin 30 defines a central longitudinal axis 42 and has a bore 44 concentrically positioned therethrough. A cross bore 46 extends from an outer surface 48 of the track pin 30 inward towards the bore 44 normal to the central longitudinal axis 42. Bushing 32 has a pair of end faces 50, an outer surface 54 and a stepped passage 56 concentrically positioned in respect to the outer surface 54. It should be appreciated that the first bearing member 34 and first collar 38 are substantially identical to the second bearing member 36 and second collar 40, therefore only first bearing member 34 and first collar 38 will be described in detail herein.

First bearing member 34 includes a first end portion 60, a second end portion 61, a bore 62 and an outer surface 63. The first end portion 60 extends radially outward away from the bore 62 and forms an abutting surface. A seal groove 64 is positioned in the second end portion 61 such that seal groove 64 is concentric with central longitudinal axis 42. The seal groove 64 has an outer wall segment 66 and an inner wall segment 68. Outer wall segment 66 is tapered outwardly with respect to the central longitudinal axis 42 at a predetermined angle. In a preferred the predetermined angle is about 5 degrees. In a similar manner inner wall segment 68 is tapered inwardly with respect to central longitudinal axis 42. It should also be recognized that the inner wall segment 68 extends axially beyond the outer wall segment 66, the benefits of which will be described in more detail below.

Still referring to FIG. 3, a first seal arrangement 70 is shown positioned in the seal grove 64. First seal arrangement 70 includes an annular load ring 72 and a seal member 74. Annular load ring 72 is made from, for example, a polycarbonate compound and seal member 74 is made from, for example, polyurethane compound. Both the annular load ring 72 and the seal member 74 could however be made from other materials without altering the functional aspects of the design. Load ring 72 and seal member 74 are positioned in seal groove 64 so that load ring 72 urges seal member 74 in an axial direction outward from the seal groove 64. Having outer wall segment 66 angled away from the central longitudinal axis 42 in the above described manner facilitates the insertion of load ring 72 and seal member 74 into seal groove 64. In particular, the predetermined angle of outer wall segment 66 enhances the installation capability of machinery utilized to insert first seal arrangement 70 into seal groove 64.

First collar 38 includes a first end portion 80, a second end portion 81, a bore 82, and an outer surface 83. The first end portion 80 extends outward from the bore 82 and forms an outer radial surface. A seal groove 84 is positioned in the second end portion 81 such that seal groove 84 is concentric with central axis 42. The seal groove 84 has an outer wall segment 86. Wall segment 86 is tapered outwardly with respect to central longitudinal axis 42 at a predetermined angle similar to the outer wall segment 66 of the first bearing member 34. Again, in a preferred embodiment the predetermined angle is about 5 degrees.

Still referring to FIG. 3, a second seal arrangement 90 and an annular axial preload member 92 are shown positioned in the seal groove 84. Second seal arrangement 90 includes an annular load ring 94 and a seal member 96. Annular load ring 94 and seal member 96 are similar in composition and function to that of annular load member 72 and seal member 74 as described above. Load ring 94 and seal member 96 are positioned in seal groove 84 so that load ring 94 urges seal member 96 in an axial direction outward from the seal groove 84.

Figure 4:
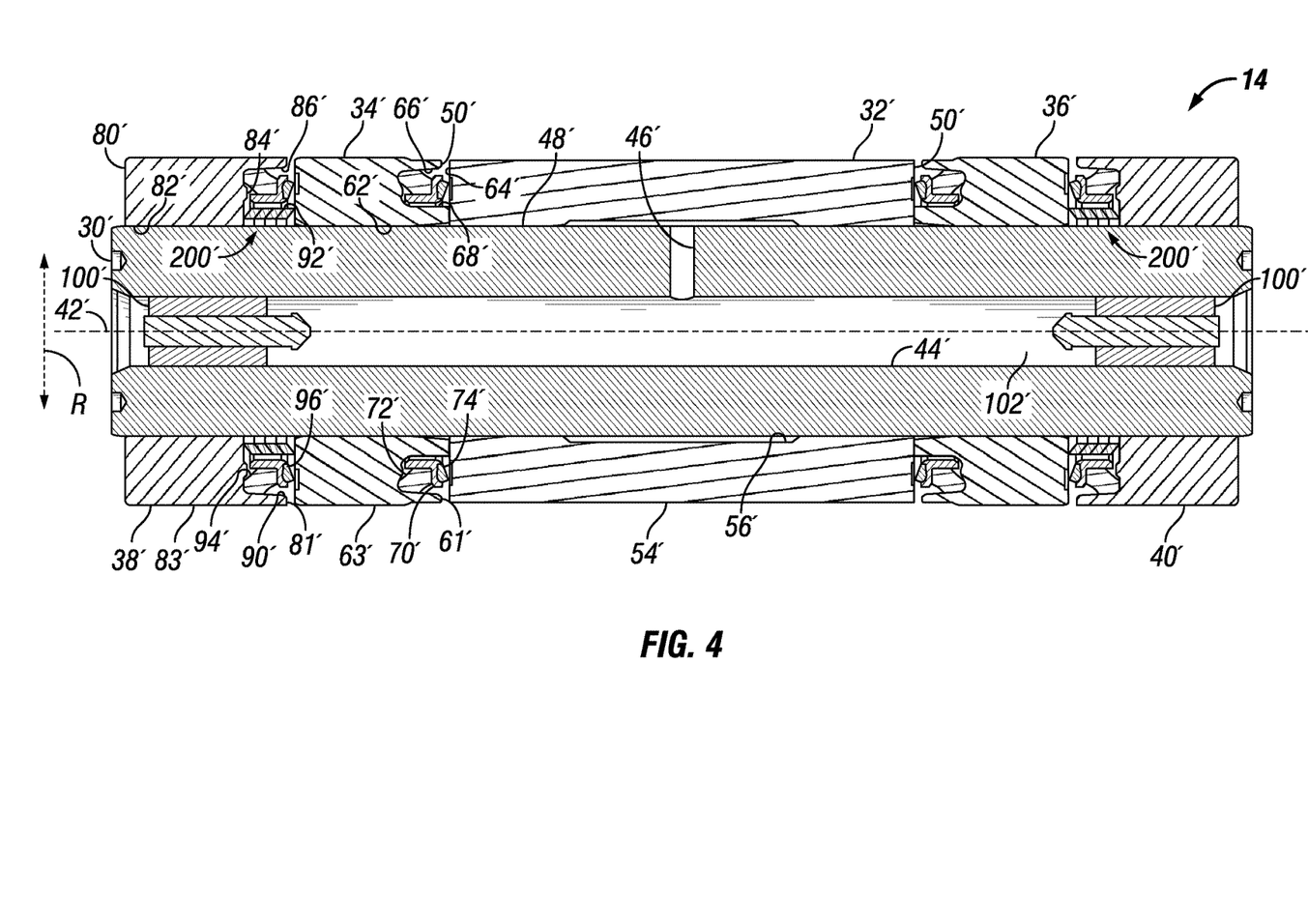
FIG. 4 is an alternate cross-sectional view of a cartridge assembly as shown in FIGS. 1 and 2.

Although the example disclosed herein has a seal groove 64 positioned in the bearing members 34, 36 and a seal groove 84 positioned in the collars 38, 40, it is also contemplated that alternative positions for the seal grooves 64, 84 could be used. For example, a seal groove may be positioned in each end face 50 of the track bushing 32, with each of the bearing members 34, 36 flipped end for end and the collars 38, 40 would be void of a seal groove 84. As shown in FIG. 4, this alternate embodiment of the cartridge assembly 14 is shown with all elements being shown with a prime designation. Additionally, the bearing members 34, 36 may not have seal grooves and instead seal grooves only placed in the collars 38, 40 and each end face 60 of the track bushing 32 for comparable capability, function and results.

A pair of plugs 100 are positioned in the bore 44 of the track pin 30 forming a fluid reservoir 102 in the bore 44 thereof. The pair of plugs 100 sealably prevents a fluid, such as lubricating oil, from leaking from the bore 44. In use, fluid disposed within fluid reservoir 102 of the cartridge assembly 14, is in fluid communication with and advanced through cross bore 46 to the outer surface 48 of track pin 30. Once disposed on outer surface 48, the fluid facilitates the rotation of first and second bearing members 34, 36, and bushing 32 relative to track pin 30. Retention of the fluid within the cartridge assembly is assisted by first and second seal arrangements 70, 90, the first ends 60 of bearing members 34, 36, and the end faces 50 of the bushing 32 while keeping debris out (e.g. sand, dirt, etc).

Figure 7:
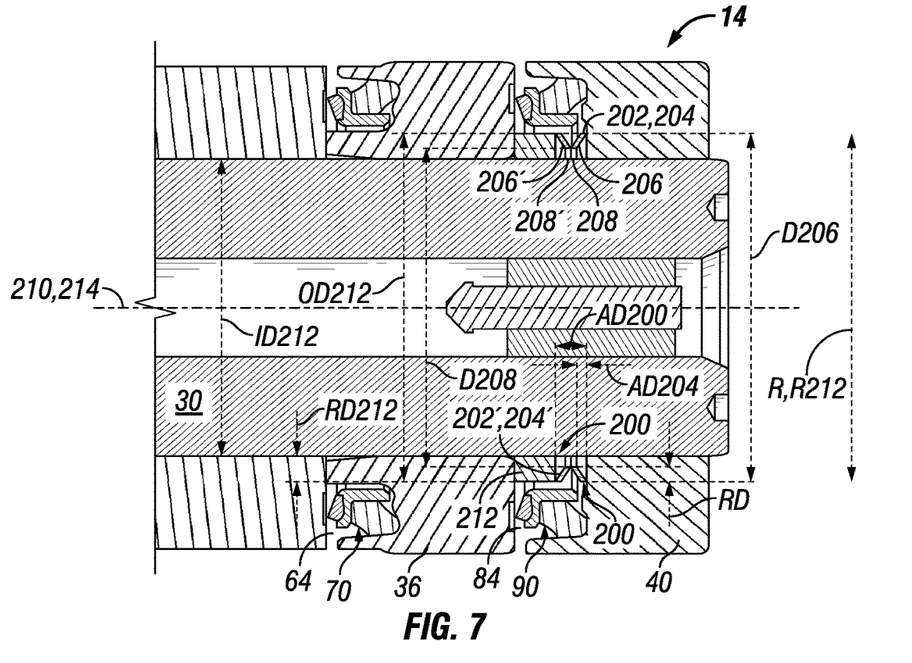
FIG. 7 is an enlarged detailed view taken from FIG. 3 showing a first embodiment of a flexible thrust washer assembly of the present disclosure.

As best seen by looking at FIGS. 3 and 7, the cartridge assembly may include a flexible thrust washer assembly 200. The flexible thrust washer assembly 200 may comprise at least a first flexible thrust washer member 202 that includes a body 204 comprising an annular skirt portion 206 that defines a central aperture 208 having an inner diameter D208. The annular skirt portion 206 also defines an outer diameter D206. The body 204 has a conical configuration that defines a conical axis 210 and a radial direction R and the outer diameter D206 of the annular skirt portion is spaced away from the central aperture 208 along the conical axis 210 and along the radial direction R, defining an axial dimension AD204 and a radial dimension RD. The flexible thrust washer assembly 200 may further comprise at least a second flexible thrust washer member 202' that is similarly configured as the first flexible thrust washer member 202. As shown in FIG. 7, the radial dimension RD and the axial dimension AD204 represent the dimensions when the flexible thrust washer member 202 is in its free state, knowing that the flexible thrust washer member 202 is deflected once inserted in the seal receiving groove defined by the first collar 40 and the first bearing member 36.

As shown most clearly in FIG. 7, the flexible thrust washer members 202, 202' contact each other near where their annular skirt portions 206, 206' define their central apertures 205. It is contemplated that they could contact where their skirt portions 206, 206' define their outer diameter D206. In such a case, the central apertures 208 would be proximate the rigid thrust washer member 212 or the first collar 40. The assembly defines axial extremities and an axial dimension AD200 therebetween (also measured in the free state), wherein a ratio between the axial dimension AD200 of the assembly to the radial dimension RD of the annular skirt 206 of a flexible thrust washer member 202 ranges from 6:1 to 1:1. As shown, both flexible thrust washer members 202, 202' are arranged in a "series" type arrangement. In yet other embodiments, more than two flexible thrust washer members may be provided such as a third or fourth washer.

In this embodiment, all the inner diameters of all the flexible thrust washer members 200, 200' range from 30 to 63 mm, all the radial dimensions for all the flexible thrust washer members range from 2 to 8 mm, and the axial dimension of the assembly ranges from 4 to 18 mm. The dimensions and ratio discussed thus far may be altered as needed or desired in other embodiments.

The rigid thrust washer member 212 is shown to have an annular cylindrical configuration that defines a radial axis R212 and a cylindrical axis 214 that are coextensive with the conical axis 210 and radial direction R of the flexible thrust washer members 200, 200'. The rigid thrust washer member 212 is also shown to have a similar outer diameter OD212 and a similar inner diameter ID212, and a similar radial dimension RD212, as the outer diameter D206, inner diameter D208 and radial dimension RD of any of the flexible thrust washer members 200, 200'. The rigid thrust washer member 212 also defines axial extremities and an axial dimension therebetween AD212, wherein a ratio of the axial dimension AD212 of the rigid thrust washer member to the radial dimension RD212 of the rigid thrust washer member is not greater than 2:1. The various dimensions and ratio of the rigid thrust washer member may be varied as needed or desired.

The dimensions of the flexible thrust washer member and rigid thrust washer member may be chosen so that contact or interference with a seal assembly is limited or avoided altogether. As used herein, the phrases "similarly dimensioned" or "similarly configured" mean that the shape or dimension of an item in question is within 20% of the other shape or other dimension of another item. In some embodiments, the shape or dimension may be within 10% or even 5% of the other shape or dimension. Any of the flexible thrust washer members discussed herein may have any suitable thickness as needed or desired. It is contemplated that in some embodiments that the thickness may range from 0.5 to 1.5 mm. In some embodiments, the thickness of the skirt may reduce from the inner diameter to the outer diameter to provide more flexibility to the washer. For the embodiments shown and described with reference to FIGS. 1-9, it is contemplated that they are completely round and symmetrical, and continuous about their concial axis 210. Other geometrical alterations may be made to the skirt to tune the flexibility of the washer such as adding slots, etc. as will be discussed in more detail later herein.

Figure 8:
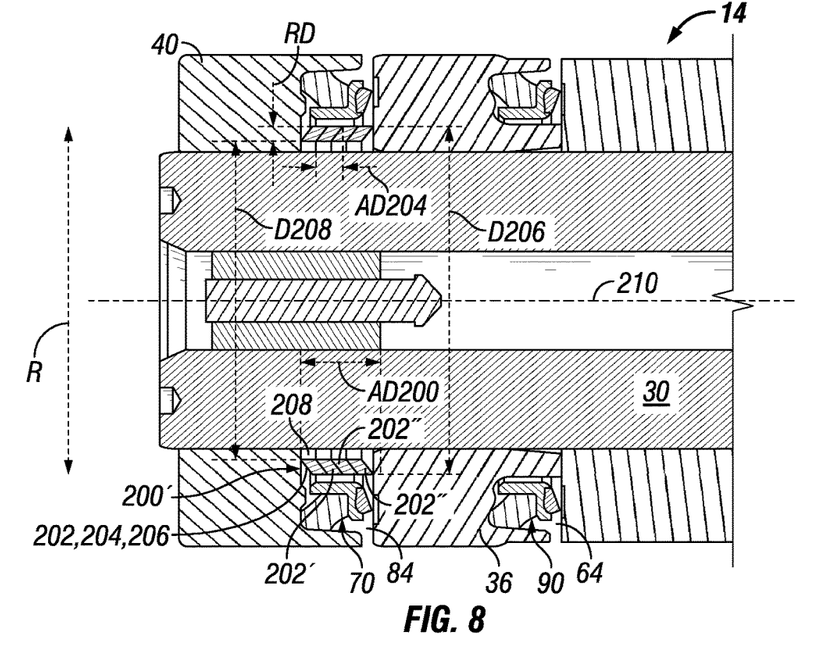
FIG. 8 is an enlarged detailed view taken from FIG. 4 showing a second embodiment of a flexible thrust washer assembly of the present disclosure.

FIGS. 4 and 8 illustrate another embodiment of a cartridge assembly 14 having another version of a flexible thrust washer assembly 200'. This flexible thrust washer assembly 200' comprises at least a first flexible thrust washer member 202 that includes a body 204 comprising an annular skirt portion 206 that defines a central aperture 208 having an inner diameter D208. The annular skirt portion 206 also defines an outer diameter D206. The body 204 of the flexible thrust washer member 202 has a conical configuration that defines a conical axis 210 and a radial direction R and the outer diameter D206 of the annular skirt portion 206 is spaced away from the central aperture 208 along the conical axis 210 and along the radial direction R, defining an axial dimension AD204 and a radial dimension RD. The assembly further comprises at least a second flexible thrust washer member 202' that is similarly configured as the first flexible washer member 202. As shown in FIGS. 4 and 8, all of the flexible thrust washer members 202, 202', 202", 202''' are nested together wherein their annular skirt portions 206 contact each other substantially from their outer diameter D206 to their inner diameter D208. This arrangement may be referred to as a "parallel" arrangement.

The assembly defines axial extremities of the assembly and an axial dimension AD200 therebetween, wherein a ratio between the axial dimension AD200 of the assembly to the radial dimension RD of the annular skirt 206 of a flexible thrust washer member 202 ranges from 6:1 to 1:1. The assembly further comprises third and fourth flexible thrust washer members and the first, second, third and fourth flexible thrust washer members 200, 202', 202", 202''' are identically configured. The number of washer members may be altered as needed or desired.

In some embodiments, all the inner diameters of all the flexible thrust washer members ranges from 30 to 63 mm, all the radial dimensions for all the flexible thrust washer members range from 2 to 8 mm, and the axial dimension of the assembly ranges from 4 to 18 mm. The dimensions and ratio may be altered as needed or desired in other embodiments. These measurements are based on the thrust washers and their assembly when in a free or undeflected state.

Figure 2:
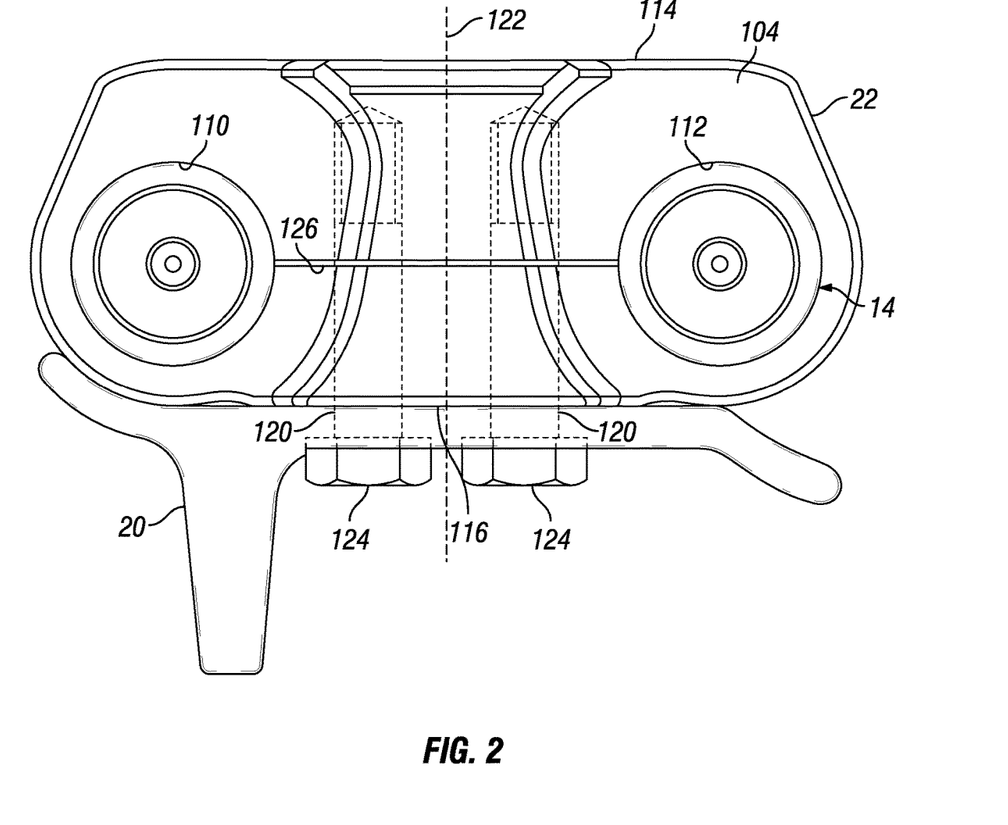
FIG. 2 is a side view of a master link from FIG. 1.

Referring now to FIGS. 1 and 2, the inner and outer link 16, 18 and the inner and outer master links 22, 24 in this embodiment are shown as being straight links each having a first end portion 111 and a second end portion 113. The inner master link 22 is an exact duplicate the outer master link 24 therefore only inner master link 22 will be described in detail and the same elements will be represented by like numbers. It should be recognized that the terms inner and outer, in reference to links 16, 18 and master links 22, 24, in this example are used merely as descriptors for the orientation shown in the figures. Other terms such left, right and first, second could be interchangeably used as well.

Inner link 22 includes a body portion 104 with a first side 106 and a second side 108 spaced opposite the first side 106. A first aperture 110 extends through the first end portion 111. A second aperture 112 extends through the second end portion 113. Body portion 104 also includes a rail surface 114 and a shoe surface 116. An aperture 120 is positioned on both sides of and a predetermined distance from a central vertical axis 122. It should be appreciated that each aperture 120 is laterally centered with respect to the widest portion of body portion 104. A fastener 124 is positioned in each of the aperture 120 and utilized to secure track shoe 20 to shoe surface 116 of inner master link 22. Additionally, a gap 126 is formed between the first aperture 110 and the second aperture 112 extending through the body portion 104 from the first side 106 to the second side 108. As the fasteners 124 are tightened to secure the track shoe 20 to the inner master link 22 the width of the gap 126 is reduced or pulled together, effectively reducing the diameter of the first and second aperture 110, 112. Thus, the first aperture 110 and the second aperture 112 are secured to the collars 38, 40 of adjacent cartridge assemblies 14.

Figure 5:
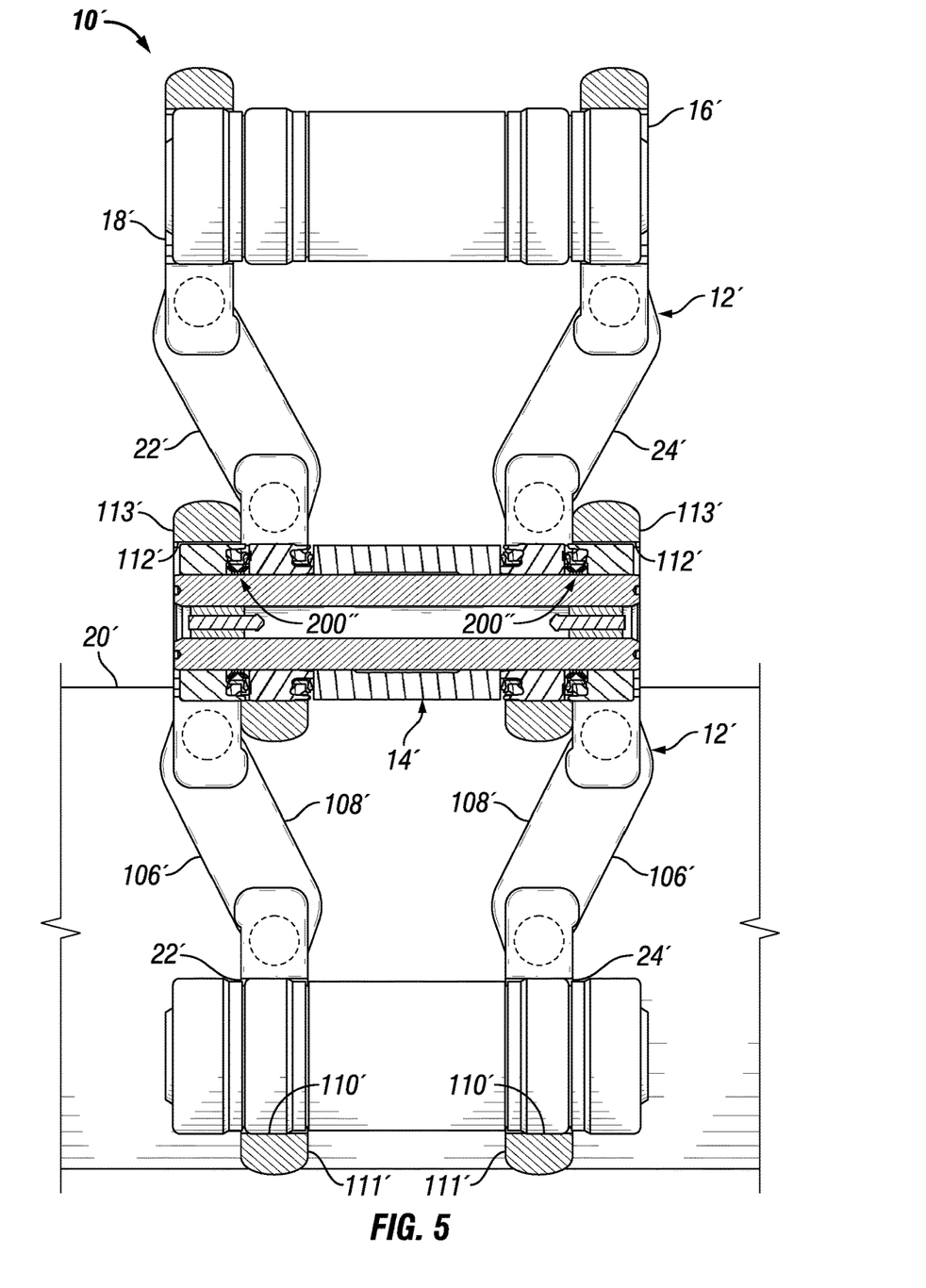
FIG. 5 is a top view of an alternate embodiment of the present disclosure of a portion of a track chain assembly.
Figure 6:
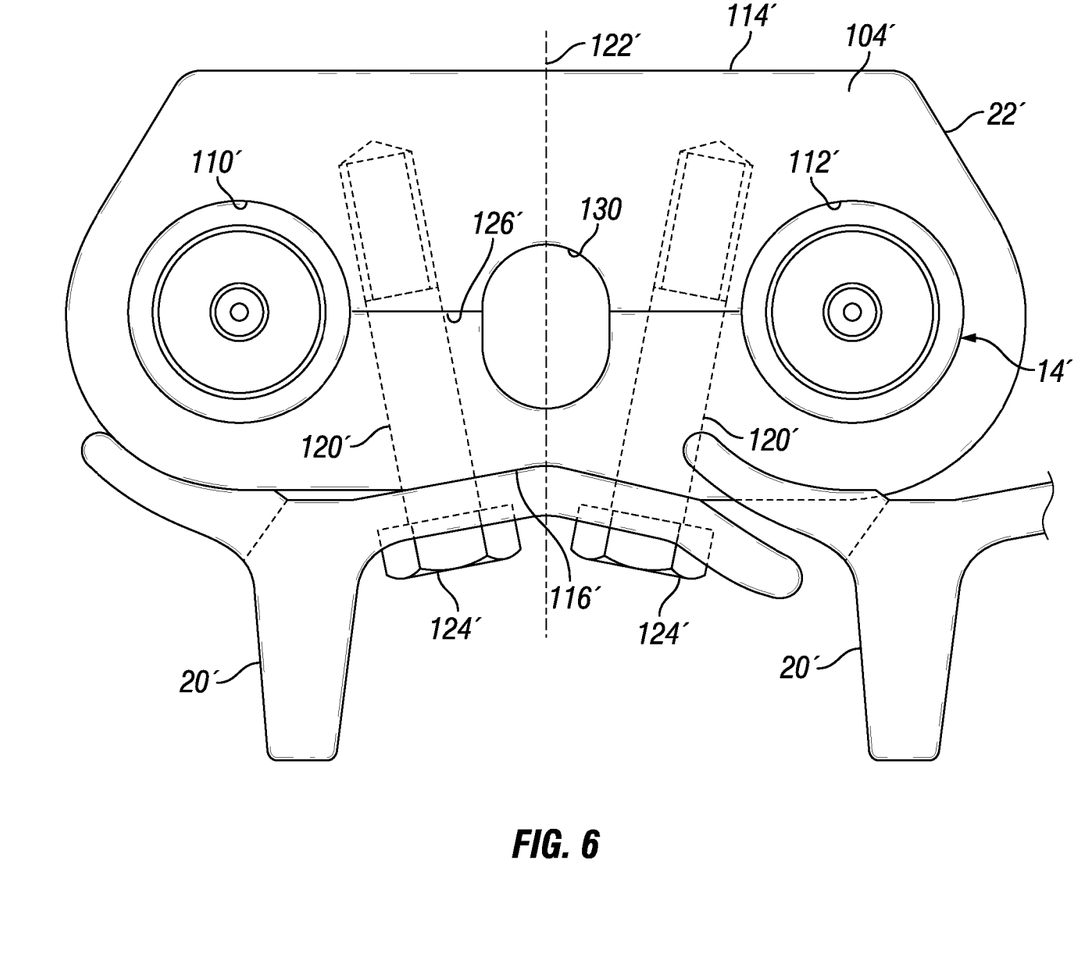
FIG. 6 is a side view of an alternate embodiment of the master link from the track chain assembly of FIG. 5.

Referring now to FIGS. 5 and 6, an alternate embodiment of the track chain assembly 10, only a portion of which is shown, with like elements of the first embodiment being represented by a prime designation. The track chain assembly 10' includes a plurality of subassemblies 12'. Each subassembly 12' includes a cartridge assembly 14', an inner and outer link 16', 18' and a track shoe 20' connected to the inner and outer links 16', 18'. An inner and outer master link 22', 24' is used to connect opposite ends of the track chain assembly 10' to form a closed loop.

The inner and outer links 16', 18' and the inner and outer master links 22', 24', in this embodiment, are offset links each being a mirror image of the other, the inner master link 22' therefore will be described in detail. Inner link 22' includes a body portion 104' having a first side 106', a second side 108', a first aperture 110', a second aperture 112', a rail surface 114', and a shoe surface 116'. Body member 104' also has an exit hole 130 interposed between first aperture 110' and second aperture 112'. An aperture 120' is positioned on either side of a vertical axis 122'. Apertures 120' are positioned at a predetermined angle with respect to the central vertical axis 122'. A fastener 124' is positioned in each of the apertures 120' and utilized to secure track shoe 20' to shoe surface 116' of inner master link 22'. Additionally, a gap 126' is positioned between the first aperture 110' and the second aperture 112' and extends through the exit hole 130 from the first side 106' to the second side 108'. As the fasteners 124' are tightened to secure the track shoe 20' to the inner and outer master links 22', 24' the diameter of the first and second aperture 110', 112' is effectively reduced. Thus, the first aperture 110' are secured to bearing members 34', 36' of one cartridge assembly 14' and the second aperture 112' are secured to the collars 38', 40' of an adjacent cartridge assembly 14'. In this embodiment, however, the inner and outer links 16', 18' and the inner and outer master links 22', 24' are offset links. Therefore, this application would require a pair of inner master links 22' and a pair of outer master links 24'. In this manner, the first aperture 110' of an inner and outer master link 22', 24' is secured to the bearing members 34', 36' of one cartridge assembly 14' and the second aperture 112' of an adjacent inner and outer master link 22', 24' is secured to the collars 38', 40' of the same cartridge assembly 14'.

Figure 9:
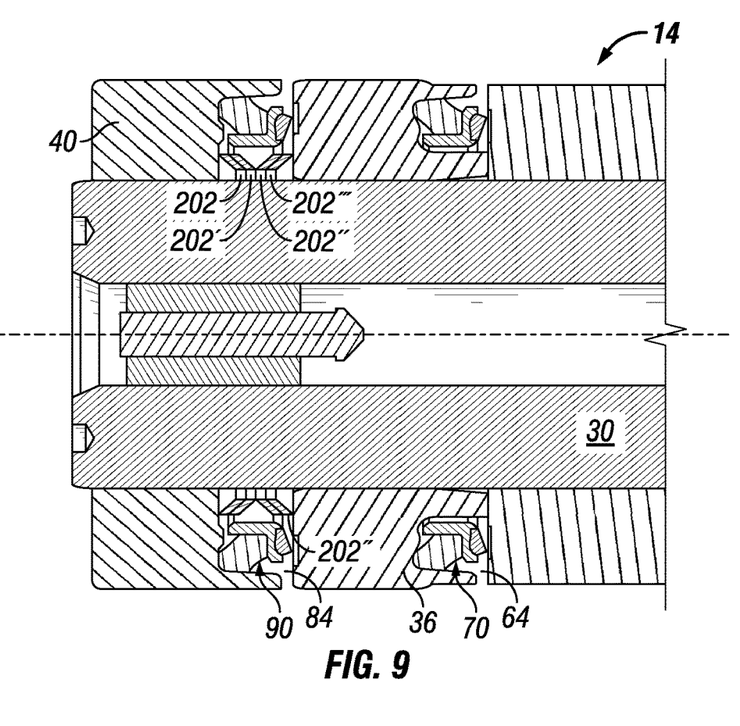
FIG. 9 is an enlarged detailed view taken from FIG. 5 showing a third embodiment of a flexible thrust washer assembly of the present disclosure.

As best seen in FIGS. 5 and 9, a third flexible thrust washer assembly 200" is depicted. For brevity, the details of the relative dimensions and ratio of this assembly will not be discussed in detail. It is to be understood that it has similar dimensions, shape, and ratios as the flexible thrust washer assemblies illustrated in FIGS. 1, 3, 4, 7 and 8 and described earlier herein. As shown most clearly in FIG. 9, the flexible washer members 202, 202', 202", 202''' are arranged in both a series and a parallel arrangement. More specifically, the pairs of outer flexible thrust washer members (202, 202' and 202", 202''') are shown to be arranged in parallel while the inner pair of flexible thrust washer members 202' and 202" are shown to be in a series arrangement. Other types of arrangements are possible.

Figure 10:
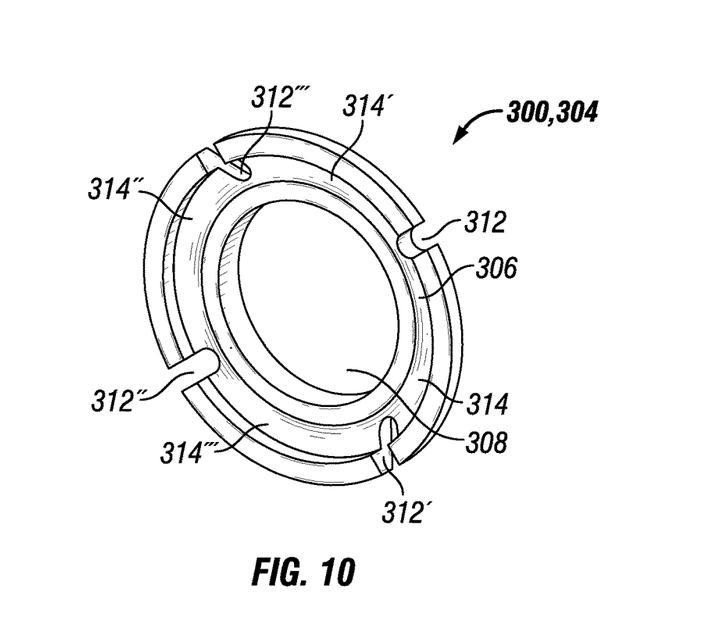
FIG. 10 is a perspective view of an embodiment of a flexible thrust washer member shown in isolation.
Figure 11:
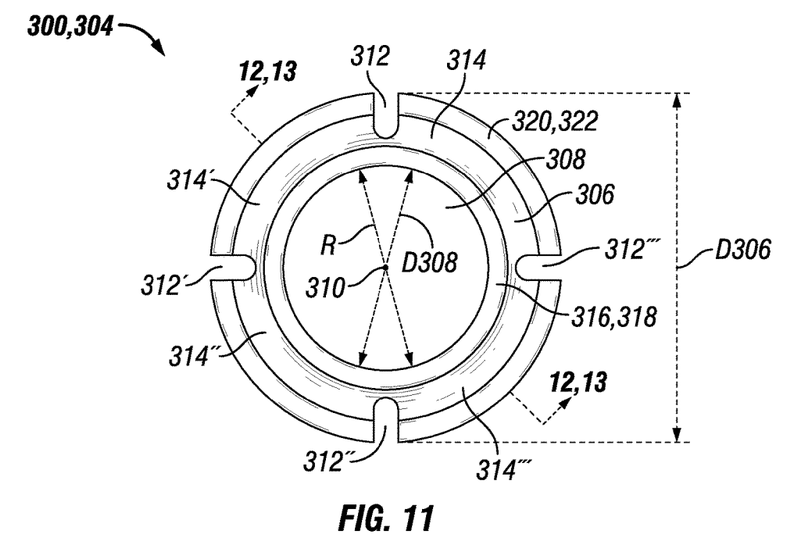
FIG. 11 is a front view of the flexible thrust washer member of FIG. 10.
Figure 12:
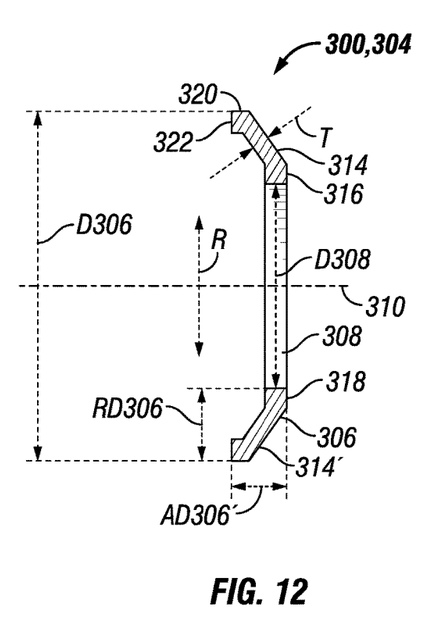
FIGS. 12 and 13 are alternate cross-sections of the flexile thrust washer of FIG. 11 taken along lines 12-12 and 13-13 thereof, respectively.

FIGS. 10-12 illustrate alternate embodiments of a flexible thrust washer member. It is to be understood that any flexible thrust washer member shown and described with reference to FIGS. 10-12 may be used with any of the embodiments discussed thus far with respect to FIGS. 1-9, being appropriately dimensioned and having the same ratios or proportions. In other words, the flexible thrust washer member 300 of FIGS. 10-12 may be substituted for the flexible thrust washer members 202 of FIGS. 1-9 if needed or desired.

As can be seen by looking at FIGS. 10-13, the flexible thrust washer member 300 comprises a body 304 that includes an annular skirt portion 306 that defines a central aperture 308 having an inner diameter D308, the annular skirt portion also defining an outer diameter D306. The body has a conical configuration that defines a conical axis 310 and a radial direction R and the outer diameter D306 of the annular skirt portion 306 is spaced away from the central aperture 308 along the conical axis 310 and along the radial direction R, defining an axial dimension AD306 and a radial dimension RD306. The body defines at least two slits 312 that separate the annular skirt portion 306 into a plurality of fingers 314 that are configured to resiliently bend when a load is applied to the fingers 314. As shown, four slits 312 and four fingers 314 are provided but this may be varied as needed or desired.

Figure 13:
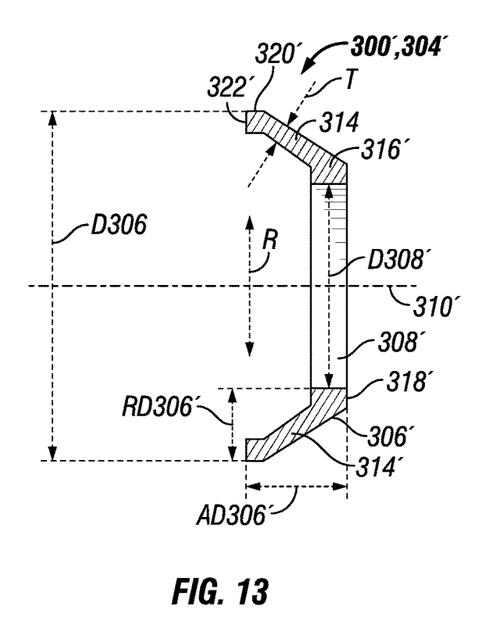

In some embodiments such as shown in FIGS. 12 and 13, the annular skirt portion 306 includes an inner flange 316 proximate the centeral aperture 308 that defines an inner thrust surface 318 that is configured to receive a load without substantially deforming and an outer flange 320 proximate the outer diameter D306 that includes an outer thrust surface 322 that is configured to receive a load without substantially deforming. These features may be omitted such as shown in FIGS. 1-9.

As mentioned previously, the annular skirt 306 defines a thickness T that may range as needed or desired. In FIG. 13, this thickness T tapers down from the inner diameter D308 toward the outer diameter D306. In FIG. 12, this thickness T remains consistent. The inner diameter of the flexible thrust washer member in FIGS. 10-13 may range from 30 to 63 mm, the radial dimension for all the flexible thrust washer members range from 2 to 8 mm, and the axial dimension of the assembly ranges from 2 to 18 mm. It is contemplated that only one flexible thrust washer member as shown in FIGS. 10-13 may be needed to be used as part of a cartridge assembly or thrust washer assembly in some embodiments.

INDUSTRIAL APPLICABILITY

In practice, a track chain assembly or a cartridge assembly may be sold or retrofitted with any of the embodiments of a flexible thrust washer assembly or individual flexible thrust washer members as described herein. In some cases, a rigid thrust washer member may also be provided.

When retrofitting a cartridge assembly 14, 14' or when a cartridge assembly is sold or otherwise provided, the flexible thrust washer assembly 200, 200', 200' may be disposed into a sealing groove 64, 84 of a bearing member 36 or a collar 40 radially between the seal assembly 70, 90 and the track pin 30 (see FIGS. 7-9). In other embodiments, a rigid thrust washer member 212 may be disposed proximate the flexible thrust washer assembly 200, 200', 200' in the seal groove 84 (see FIG. 7) to minimize the number of flexible thrust washer members needed. In certain embodiments, at least two flexible washer members 202, 202' contact each other minimally, forming a series arrangement for the flexible thrust washer members (see FIG. 7).

In yet further embodiments, the flexible thrust washer members may be heat treated or coated to prevent wear or galling. Examples of this include nitride coatings, carburizing, ADLC (amorphous diamond like carbon) coatings, etc. As shown in FIGS. 3 and 4, the cartridge assembly 14, may include a generally cylindrical configuration that defines a cylindrical axis 42 and a radial direction R. The assembly may further define an axial plane AP, perpendicular to the cylindrical axis 42, which is a plane of symmetry. In other words, components may be repeatedly used in the cartridge on either side of this plane to minimize the cost of manufacturing. Any of these features may be omitted or altered in other embodiments. Typically, any of the embodiments discussed herein may be made using a progressive stamping die or similar process to form the desired shape of the flexible thrust washer.

The track chain assembly 10, 10' is assembled and operates as follows. The cartridge assembly 14, 14' can be preassembled prior to assembling the track chain 10, 10' in the following manner. The track pin 30 is inserted into the stepped passage 56 of bushing 32 such that bushing 32 can rotate relative to track pin 30. First seal arrangements 70 are inserted into the seal groove 64 of the bearing members 34, 36. The bearing members 34, 36 are positioned relative to track pin 28 until the inner wall segment 68 is positioned in close proximity to the end face 50 of bushing 32 with the seal groove 64 positioned adjacent to each end face 50 of bushing 32. This positions the seal member 74 to be urged against end face 50 of bushing 32. The bushing 32 and the bearing members 34, 36 are positioned along axial center of the track pin 30 so that a portion of the track pin 30 extends through bore 62 and beyond the first end portion 60. It should be appreciated that bearing members 34, 36 can rotate about the track pin 30 around axis 42 relative to both bushing 32 and track pin 30.

Annular axial preload members 92 are positioned about the outer surface 48 of the track pin 30 adjacent to the first end portion 60 of the bearing members 34, 36. First seal arrangements 70 are inserted into the seal groove 84 of the collars 38, 40. The collars 38, 40 are positioned relative to track pin 30 and bearing member 34, 36 so that a portion of track pin 30 extends into bore 82 with the second end portion 81 of collars 38, 40 in an adjacent relationship to the first end portion 60 of bearing members 34, 36. This positions the seal member 94 to be urged against the first end portion 60 of each bearing member 34, 36. The annular axial preload member 92 controls the distance that the collars 38, 40 can be positioned inward toward bearing members 34, 36, and thus the bearing members 34, 36 moved inward toward the bushing 32.

The collars 38, 40 are fixed relative to track pin 30 so that collars 38, 40 will not rotate or move axially relative to track pin 30. For example, collars 38, 40 can be press fit onto, laser welded to, adhesive or chemically bonded to the track pin 30 or any other known manner of attaching two mechanical components. Attaching collars 38, 40 to track pin 30 helps control end play of track chain assembly 10, 10'.

As previously mentioned, referring to FIG. 1, each subassembly 12 includes a cartridge assembly 14, an inner link 16, an outer link 18 and a track shoe 20 fastened to the shoe surface 116 of the inner and outer links 16, 18. Specifically, one sub assembly is completed by positioning inner link 16 relative to cartridge assembly 14 such that bearing member 34 of cartridge assembly 14 is located within aperture 112 of inner link 16, bearing member 36 of cartridge assembly 14 is located within aperture 112 of outer link 18. The combination of the inner link 16, outer link 18 and the cartridge assembly 14 forms a subassembly 12. The next adjacent subassembly 12 would be an outer subassembly 12, comprised of identical components that have the inner link 16 positioned relative to cartridge assembly 14 so that collar 38 is located within aperture 110 of inner link 16 and collar 40 is located within aperture 110 of outer link 18. It should be appreciated that bearing members 34, 36 and collars 38, 40 are press fit into apertures 110 and 112 of the inner and outer links 16, 18. Additionally, the inner links 16 and outer links 18 of adjacent sub-assemblies 12 are positioned with a predetermined space therebetween, preferably the predetermined space is 1.5 mm. The outer sub assembly 12 is fixed relative to collars 38, 40 and the track pin 30, with an inner subassembly 12 fixed relative to bearing members 34, 36. This allows the inner subassembly 12 to move relative to the track pin 30 and bushing 32, while the outer subassembly 12 is fixed relative to the track pin 30 but free to pivot relative to the bearing members 34, 36 and the track bushing 32.

This alternating connection of inner and outer assemblies is continued until an appropriate number of adjacent subassemblies 12 are connected together to form a track chain assembly 10 of a given length. Then an inner and outer master link 22, 24 are slid over the collars 38, 40 of two adjacent subassemblies and the last track shoe 20 is fastened in place. By tightening fasteners 124 the width of the gap 126 is reduced or pulled together effectively reducing the diameter of the first and second aperture 110, 112, securing the first and second apertures 110, 112 to the collars 38, 40 of the two adjacent sub-assemblies 12.

In the alternate embodiment shown in FIGS. 3 and 4, each subassembly 12' includes a cartridge assembly 14', an inner link 16', an outer link 18' and a track shoe 20' fastened to the shoe surface 116' of the inner and outer links 16', 18'. Specifically, one sub assembly is completed by positioning inner link 16' relative to cartridge assembly 14' such that bearing member 34' of cartridge assembly 14' is located within aperture 110' of inner link 16', bearing member 36' of cartridge assembly 14' is located within aperture 110' of outer link 18' forming a sub assembly 12'. Two adjacent subassemblies 12' are secured together by placing collar 38' within aperture 112' of the inner link 16' and collar 40' within aperture 112' of outer link 18'. It should be appreciated that bearing members 34', 36' are press fit into apertures 110' and collars 38', 40' are press fit into apertures 112' of the inner and outer links 16', 18'. The first end portion 111' of each inner and outer link 16', 18' is fixed relative to bearing members 34', 36' and the second end portion 113' of the inner and outer links 16', 18' fixed relative collars 38', 40' and the track pin 30' of an adjacent an sub assembly 12'. This allows the first end portion 111 ' of inner and outer links 16', 18' to move relative to the track pin 30' and bushing 32', while the second end portion 113' to be fixed relative to the track pin 30' but free to pivot relative to the bearing members 34', 36' and the track bushing 32' of an adjacent sub assembly 12'.

This connection subassemblies 12' is continued until an appropriate number of adjacent subassemblies 12' are connected together to form a track chain assembly 10' of a given length. To connect the ends of the track chain assembly 10' of this embodiment together, two inner and outer master links 22', 24' are required. Apertures 110' of the first end portion 111' of an inner and an outer master link 22', 24' are positioned around the bearing member 34', 36' of a cartridge assembly 14'. Apertures 112' of the second end portion 113' of an adjacent set of inner and outer master links 22', 24' are positioned around collars 38', 40' of the same cartridge assembly 14'. The last two track shoes 20' are then fastened to the shoe surface 116' of the two adjacent sets of inner and outer master links 22', 24'. By tightening fasteners 124' the width of the gap 126 is reduced or pulled together effectively reducing the diameter of the first and second apertures 110', 112', securing the first apertures 110' to the bearing members 34', 36' and the second apertures 112' to the collars 38', 40' of the same cartridge assembly 14'. Disconnecting the ends of the track chain assembly 10' of this embodiment requires loosening the fasteners 124' of the adjacent sets of inner and outer master links 22', 24', this allows a single cartridge assembly 14' to be removed and the ends of the track chain assembly 10' to be separated.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the disclosure(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A flexible thrust washer assembly comprising:
    at least a first flexible thrust washer member that includes a body comprising:
        an annular skirt portion that defines a central aperture having an inner diameter, the annular skirt portion also defining an outer diameter;
        wherein the body has a conical configuration that defines a conical axis and a radial direction and the outer diameter of the annular skirt portion is spaced away from the central aperture along the conical axis and along the radial direction, defining an axial dimension and a radial dimension; and
    at least a second flexible thrust washer member that is similarly configured as the first flexible thrust washer member;
    wherein the assembly defines axial extremities of the assembly and an axial dimension therebetween, wherein a ratio between the axial dimension of the assembly to the radial dimension of the annular skirt of a flexible thrust washer member ranges from 6:1 to 1:1.

2. The assembly of claim 1 wherein the assembly further comprises a third and fourth flexible thrust washer members and the first, second, third and fourth flexible thrust washer members are identically configured.

3. The assembly of claim 1 wherein all the inner diameters of all the flexible thrust washer members ranges from 30 to 63 mm.

4. The assembly of claim 3 wherein all the radial dimensions for all the flexible thrust washer members range from 2 to 8 mm.

5. The assembly of claim 1 wherein the axial dimension of the assembly ranges from 4 to 18 mm.

6. The assembly of claim 1 further comprising a rigid thrust washer member having a annular cylindrical configuration that defines a radial axis, a cylindrical axis, a similar outer diameter and a similar inner diameter, and a similar radial dimension, as the outer diameter, inner diameter and radial dimension of any of the flexible thrust washer members, the rigid thrust washer member also defining axial extremities and an axial dimension therebetween, wherein a ratio of the axial dimension of the rigid thrust washer member to the radial dimension of the rigid thrust washer member is not greater than 2:1 and wherein the flexible thrust washer members contact each other near where their annular skirt portions define their central apertures or where their skirt portions define their outer diameter.

7. A flexible thrust washer member comprising:
    a body including:
        an annular skirt portion that defines a central aperture having an inner diameter, the annular skirt portion also defining an outer diameter;
        wherein the body has a conical configuration that defines a conical axis and a radial direction and the outer diameter of the annular skirt portion is spaced away from the central aperture along the conical axis and along the radial direction, defining an axial dimension and a radial dimension; and
    wherein the body defines at least two slits that separate the annular skirt portion into a plurality of fingers that are configured to resiliently bend when a load is applied to the fingers.

8. The member of claim 7 wherein the annular skirt portion includes an inner flange proximate the centeral aperture that defines an inner thrust surface that is configured to receive a load without substantially deforming and an outer flange proximate the outer diameter that includes an outer thrust surface that is configured to receive a load without substantially deforming.

9. The member of claim 8 wherein the annular skirt defines a thickness and the thickness tapers down from the inner diameter toward the outer diameter.

10. The member of claim 7 wherein the inner diameter of the flexible thrust washer member ranges from 30 to 63 mm, the radial dimension for the flexible thrust washer member ranges from 2 to 8 mm, and the axial dimension of the flexible thrust washer member ranges from 2 to 18 mm.

11. A cartridge assembly for a track chain comprising:
   a first bearing member having a first end portion, a second end portion, a bore defined therethrough and a seal groove defined in said second end portion;
   a track pin disposed within said first bore of said bearing member;
   a bushing having a passage defined therethrough, said bushing being positioned relative to said track pin and said first bearing member such that said track pin is disposed within said passage and an end face of said bushing is positioned in an opposing relationship with said seal groove of said first bearing member;
   a first collar having a first end portion, a second end portion, and a bore defined therein, said first collar having a seal groove positioned in the second end portion of said first collar and being positioned relative to said track pin and said first bearing member such that said track pin is disposed within said bore and said second end portion of said first collar is positioned in an opposing relationship with said first end portion of said first bearing member;
   a seal assembly disposed in the seal receiving groove of the bearing member or the collar; and
   a flexible thrust washer assembly disposed into the seal receiving groove between the seal assembly and the track pin, wherein at least two of the flexible thrust washer members are nested in parallel.

12. The cartridge assembly of claim 11 wherein the flexible thrust washer assembly comprises:
   at least a first flexible thrust washer member that includes a body comprising:
      an annular skirt portion that defines a central aperture having an inner diameter, the annular skirt portion also defining an outer diameter;
   wherein the body has a conical configuration that defines a conical axis and a radial direction and the outer diameter of the annular skirt portion is spaced away from the central aperture along the conical axis and along the radial direction, defining an axial dimension and a radial dimension; and
   at least a second flexible thrust washer member that is similarly configured as the first flexible thrust washer member;
   wherein the assembly defines axial extremities of the assembly and an axial dimension therebetween, wherein a ratio between the axial dimension of the assembly to the radial dimension of the annular skirt of a flexible thrust washer member ranges from 6:1 to 1:1.

13. The cartridge assembly of claim 11 wherein said collar is fixed in relation to said track pin such that said first collar is unable to rotate relative to said track pin, and said first bearing member is able to rotate relative to said first collar and said track pin.

14. The cartridge assembly of claim 11 further comprising a rigid thrust washer member disposed proximate the flexible thrust washer assembly in the seal groove.

15. The cartridge assembly of claim 11 wherein the flexible thrust washer assembly is positioned in the seal receiving groove of the first collar.

16. The cartridge assembly of claim 11 wherein said track pin has a fluid reservoir defined therein.

17. The cartridge assembly of claim 11 wherein at least two of the flexible thrust washer members contact each other minimally, forming a series arrangement for the flexible thrust washer members.

18. The cartridge assembly of claim 11 wherein the flexible thrust washer members are heat treated or coated to prevent wear or galling.

19. The cartridge assembly of claim 11 wherein the assembly includes a generally cylindrical configuration that defines a cylindrical axis and a radial direction, the assembly further defining an axial plane of symmetry.

* * * * *